C. ROBERTS.
Thrashing Machine.
No. 32,085.
2 Sheets—Sheet 1.
Patented April 16, 1861.
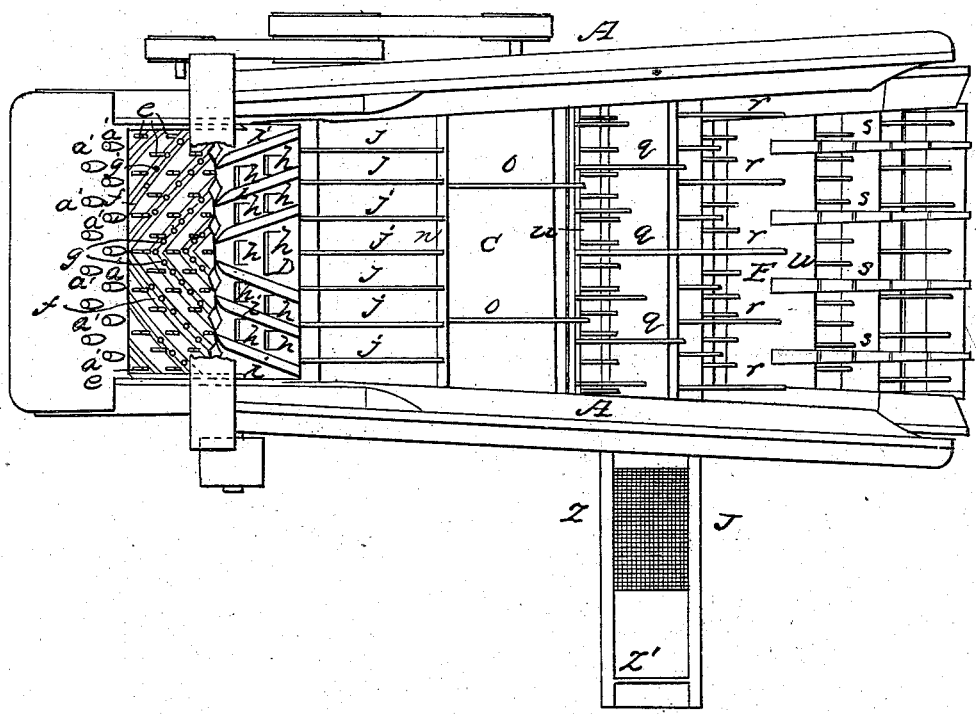
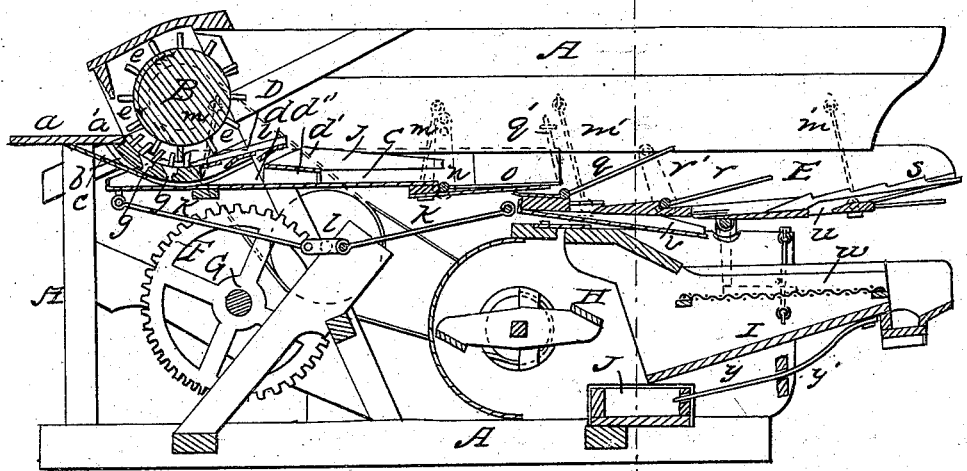
Witnesses:
Inventor C. ROBERTS.
Thrashing Machine.

No. 32,085.

2 Sheets—Sheet 2.

Patented April 16, 1861.

Witnesses:

Inventor

UNITED STATES PATENT OFFICE.

CYRUS ROBERTS, OF BELLEVILLE, ILLINOIS.

MACHINE FOR THRESHING AND SEPARATING GRAIN.

Specification forming part of Letters Patent No. 32,085, dated April 16, 1861; Reissued June 8, 1869, No. 3,486.

*To all whom it may concern:*

Be it known that I, CYRUS ROBERTS, of Belleville, in the county of St. Clair and State of Illinois, have invented certain new and useful Improvements in Grain Threshers and Separators, of which the following is a full, clear, and exact description, reference being had to the accompanying drawings, making part of this specification, in which—

Figure 3:
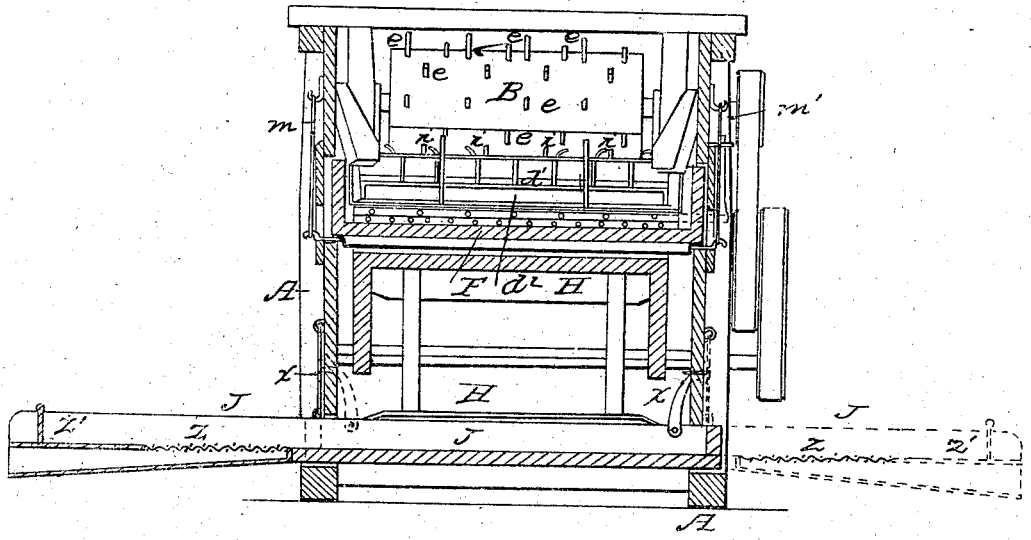
Figure 4:
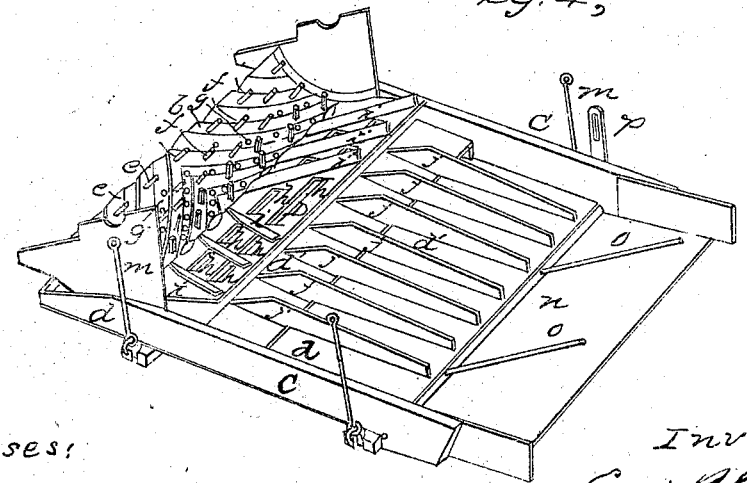

Figure 1 represents a top view of a grain thresher and separator, embracing my said improvements, the threshing cylinder being removed. Fig. 2 represents a vertical longitudinal section of the machine. Fig. 3 represents a transverse section at the line $x\ x$ of Fig. 2, and Fig. 4 represents a view in perspective of the rear section of the conveyer, the toothed, grooved, perforated concave, and the ribbed, perforated plate in front thereof, showing the construction and relative positions of these parts, detached from the machine.

I term that end of the machine at which the sheaf of grain is fed in—the rear end; that end at which the straw and chaff are delivered, I call the front end of the machine.

The object of my said improvements is the more effectually and readily to separate the grain from the straw and chaff, and this object is effected, by first separating the chaff and grain from the straw by means of a separator, and then separating the grain from the chaff by means of a winnower, as hereinafter described.

In the accompanying drawings A represents the main frame of the machine.

B is the threshing cylinder, which is caused to revolve rapidly in the direction of the arrow in Fig. 2, by means of suitable belting or gearing.

$a$ is a perforated feed board, located in rear of the cylinder, upon which the sheaf of grain is spread and from which it is fed in between the cylinder (B) and the concave ($b$) beneath it. That part of the feed board contiguous to the cylinder is furnished with a series of holes ($a'\ a'$) through which the loose kernels of grain may pass, which will be separated from the straw as it is spread upon the feed board, and by the action of the spikes of the cylinder in drawing the straw in beneath the cylinder.

The kernels of grain that thus pass through the feed board are received upon the incline $c$, whence they are delivered upon the bottom ($d$) of the rear section C of the conveyer and separator, without first passing through the threshing apparatus, and therefore without risk of being broken.

The cylinder B and the concave $b$ are provided, as usual in threshing machines, with teeth or spikes ($e$), as shown in the drawings; and in addition, diverging grooves ($f$) are arranged in the surface of the concave for the cylinder to beat the grain against, and to distribute the threshed grain and deliver it more evenly upon the inclined plate (D). The concave is also pierced with holes ($g$), large enough to allow a portion of the grain to pass through them, and fall upon the bottom ($d$) of section ($c$) of the conveyer. From the concave the straw, grain, etc., is thrown by the rapid revolution of the threshing cylinder up a slight incline (D) pierced with openings ($h$), through which a portion of the grain passes and is received upon the bottom of the conveyer. This incline is also provided with diverging grooves formed in the present instance by ribs ($i$), still further to divide and distribute the mass of straw, etc., and deliver it evenly upon the fingers ($j$) so as to facilitate the descent of the grain from it.

The conveyer and separator, as shown in the drawings, is formed of two sections C, and E, to which opposite and simultaneous vibrating motions are given by means of two connecting rods ($k$) attached to a double crank ($k'$) on a shaft located beneath the rear section C, which shaft carries a pinion ($l$) gearing with the large toothed wheel (F) on the main shaft (G) which may be driven by a belt or in any other convenient way. The other ends of the two connecting rods are attached to the rear ends of the two sections of the conveyer and separator, as shown in Fig. 2. The sections C, and E, are suspended by means of radius bars ($m, m'$), and they thus have a vertical oscillatory motion as well as a back and forth motion. By the opposite and simultaneous motions of the sections of the conveyer and separator, the momentum and inertia of one part will be counteracted by that of the other and thus there will not be so great a tendency to jarring and unsteadiness in the frame when the machine is in motion. Other important results are also thereby attained which will be hereafter mentioned. The mixed mass of straw, grain, etc., is thrown from beneath the threshing cylinder up the inclined plate (D), through the openings (h) in which, much of the grain passes, and the grooves in which constantly tend to spread out the mass laterally as it is delivered to the elevated fingers (j). The grain which passes through the holes or openings in the feed board (a), the concave (b) and the inclined plate (D), and which are shown in the drawings respectively at a', g, and h, is received upon the bottom (d) of the first or rear section (C), of the conveyer, which extends beneath the concave and incline (c) for that purpose; that portion of the grain which remains with the mass of straw, etc., is delivered upon the fingers (j), and more of the grain is here separated from the straw, and falls upon the bottom d between the fingers. These fingers are so arranged with respect to the bottom of the conveyer as to carry off the bulk of the straw, while the bulk of the grain is carried by the bottom (d). They are elevated above the bottom, being attached by their rear ends to a diaphragm or false bottom (d') which forms a part of and vibrates with the rear section of the conveyer, and carries the fingers with it in its vibrations. A space (d'') is thus left beneath the diaphragm (d') and fingers (j) in which the grain is carried forward and over the head or shaft (n), of the shaking fingers (o) without obstructing its action. These fingers have thus to shake up only the bulk of straw, etc., which is delivered upon them from the fingers (j), and their labor is therefore much less than if the whole mass of mixed straw, grain, etc., was delivered to them before this partial separation.

The diaphragm or false bottom (d'), to which the elevated fingers (j), are attached may be extended forward to the ends of the fingers, and they may be fastened to it throughout their length, but no advantage is gained by so constructing it.

The vibrating shaking fingers (o) are attached to a rod or shaft (n) and are caused to rise on the forward swing of the rear section of the conveyer and lift and shake the straw, at the same time facilitating its progress through the conveyer, and the separation of the grain from it; and then with the back swing of the section they resume their position upon the bottom of the conveyer; the motions of the fingers being regulated by, and uniform with those of the rear section of the conveyer; though they only lift and shake the straw on its advance motion. By the simultaneous, opposite motions of the two sections of the conveyer, the mass of straw, grain and chaff, lying across their overlapping ends, is drawn out and attenuated, and the grain is thus allowed to drop more readily from the straw by its weight, and fall into the winnower, as hereinafter described. As section (C), of the conveyer advances, the fingers rise and lift the straw, at the same time urging it forward and throwing a portion of the mass upon the front section (E). Again when the motion of the sections is reversed, and the rear section (C), recedes, the front one (E), at the same time advancing, the mass of straw, etc., upon the front section (E) moving forward with it, is drawn away from that upon the rear section (C), because it tends to move back with said section and thus the mass is drawn out and attenuated whenever the front and rear sections of the conveyer move toward their respective ends of the machine.

The bar or shaft (n) to which the shaking fingers (o) are attached, lies in a recess in the bottom of the conveyer so as to present no obstruction to the passage of the grain over it, and it has its bearings in the opposite sides of the conveyer. One end projects beyond its bearing to receive the lower end of a rod or lever (p), the upper end of which rests against a pin, or passes through a staple in the side of the machine, or is arranged in any convenient way so as not to be permitted to follow the motions of the conveyer as it vibrates back and forth, while it is free to move up and down, allowing the lower end of the lever, and the shaft of the fingers (o) to move back and forth with the conveyer. By such means the shaft (n) will be caused to oscillate, raising and lowering the fingers uniformly with the forward and back motions of the rear section of the conveyer.

The grain etc., carried by the bottom (d) of the rear section (C) of the conveyer is delivered directly upon the front section (E); while the straw and coarse stuff and grain mixed therewith is delivered from the vibrating shaking fingers (o) to other and successive series of vibrating, shaking fingers (q and r) which are arranged in the front section (E) of the conveyer, and are operated by means of rods or levers (q and r') in like manner with those attached to section (C), already described, and which in like manner rise upon the forward swing of the section, and resume their horizontal positions as the section swings back. These fingers give the straw a still further shaking and effectually separate the grain from the straw before the latter is thrown out at the front end of the front section (E), over the long, inclined fingers (s), the notches in which prevent the straw from slipping back upon the shaking fingers (r). The grain, chaff, and fine stuff pass through the apertures or throats (u) in the bottom of section (E), and fall upon the incline (v) and upon the riddles of the winnower, as shown at w, where the mixed mass is subjected to the action of a fan wheel (H), as in ordinary winnowing machines.

The apertures or throats (u) have fine fingers over them which render the separation finer and more complete and prevent any long straws or coarse stuff from passing through to fall upon the riddles, thereby lessening the labor of the latter in cleaning the grain.

The chaff and dust are separated from the grain by the blast from the fan wheel (H), and blown out at the end of the shoe while the grain from its weight falls upon the inclined bottom (I) of the shoe, and is shaken down into the discharging spout.

The shoe with the riddles attached is caused to vibrate rapidly from side to side in any usual or convenient way, but as I make no claim to this portion of the machine, I deem it unnecessary particularly to describe its construction and mode of operation.

The discharging spout (J) is reversible and may be used to discharge the grain at either side of the machine; it may also be removed when desired so that the machine may more readily be transported from place to place. It is sometimes desirable to discharge the grain at a particular side of the machine; and my reversible spout may be removed from one side and arranged to discharge the grain at the other whenever it may be desired. The spout is hung upon radius bars (x) and is caused by any convenient means to vibrate back and forth, the radius bars giving it at the same time a vertical oscillatory motion. In this instance its motion is derived from the motion of the shoe by means of a rod or lever (y) pivoted as at (y'), and attached to the side of the spout. The spout must extend from one side of the machine to the other beneath the lower end of the shoe, so as to catch all the grain that falls from the riddles upon the inclined bottom (I), of the shoe. It projects some distance beyond the side of the machine, and this projecting portion has a double bottom; the upper or false bottom I generally make horizontal, and the lower one inclined. The false bottom has an opening in it as wide as the spout and of any desirable length over which a screen (z) is placed when the machine is used for threshing and cleaning wheat; this screen is shown in Figs. 1 and 3 of the drawings. When the screen is used a trap or gate z' is placed at the end of the upper part of the spout, as shown, the use of which is to catch any kernels of grain from which the straw and chaff may not have been entirely separated and which are therefore too large to pass through the screen. These, as well as foreign substances which may have passed through the machine, pass over the screen (z) and are thrown against the trap (z') which prevents their falling out and mixing with the cleaned wheat which has passed through the screen, along the inclined bottom of the spout, and out at the end. The matter that accumulates against the trap may be removed from time to time and again passed through the machine.

When the machine is used for threshing and cleaning oats, both screen and trap may be removed.

Having thus described the construction and operation of my improved machine, what I claim therein as new and desire to secure by Letters Patent, is:

1. The combination of the grated feed board (a) and inclined conveying board (c) of the thresher, with the vibrating conveyer, substantially as herein specified.

2. Constructing the concave with diverging, distributing grooves, substantially as described.

3. The combination with grooves in the concave of supplemental distributing grooves in front of the concave, substantially as described.

4. Constructing the separator in sections having opposite and simultaneous vibrating motion, in combination with shaking fingers overlapping the opening between the sections, substantially as described.

5. The method of separating the grain from the straw by drawing out and attenuating and at the same time shaking by means of lifting fingers the mass of mixed straw, grain, and chaff over the opening between the sections of the separator, substantially as described.

6. The diaphragm (d), the fingers (j) above, the space (d''), and bottom (d) below, in combination, substantially as described.

7. The combination with a vibrating conveyer and separator of fine vibrating fingers over the throat of the conveyer and coarse vibrating and shaking fingers above the finer ones, the coarse fingers shaking up the straw and making a coarse separation, and the finer fingers making it finer and more complete, thereby facilitating the winnowing.

8. The combination of the head trap (z') with a wheat screen (z), acting together substantially as described.

In testimony whereof I have hereunto subscribed my name.

CYRUS ROBERTS.

Witnesses:
W. RENWICK SMEDBERG,
JOHN S. HOLLINGSHEAD.